US007585353B2

United States Patent
Gambin et al.

(10) Patent No.: US 7,585,353 B2
(45) Date of Patent: Sep. 8, 2009

(54) METHOD FOR REDUCING HEAVY METALS IN FLUE GASES

(75) Inventors: Amandine Gambin, Ternuay (FR); Alain Laudet, Namur (BE)

(73) Assignee: S.A. Lhoist Recherche et Developpment (BE)

( * ) Notice: Subject to any disclaimer, the term of this patent is extended or adjusted under 35 U.S.C. 154(b) by 335 days.

(21) Appl. No.: 10/592,412

(22) PCT Filed: Mar. 14, 2005

(86) PCT No.: PCT/EP2005/051141

§ 371 (c)(1), (2), (4) Date: Sep. 11, 2006

(87) PCT Pub. No.: WO2005/099872

PCT Pub. Date: Oct. 27, 2005

(65) Prior Publication Data

US 2007/0217979 A1      Sep. 20, 2007

(30) Foreign Application Priority Data

Mar. 15, 2004   (BE) .................................. 2004/0136

(51) Int. Cl.
*B01D 53/02* (2006.01)
(52) U.S. Cl. .......................... 95/133; 95/134; 502/253; 423/107; 423/594.14; 423/594.18
(58) Field of Classification Search ............ 95/90, 95/133, 134; 502/253; 423/107, 594.14, 423/594.18
See application file for complete search history.

(56) References Cited

U.S. PATENT DOCUMENTS

| 3,750,372 | A | * | 8/1973 | St. Cyr et al. ................. 95/132 |
| 4,207,152 | A | * | 6/1980 | Kadija et al. ................. 205/536 |
| 4,387,653 | A | * | 6/1983 | Voss ........................... 423/230 |
| 6,168,709 | B1 | | 1/2001 | Etter .......................... 208/131 |
| 6,719,828 | B1 | * | 4/2004 | Lovell et al. ................... 95/134 |

FOREIGN PATENT DOCUMENTS

| DE | 4034417 | 4/1992 |
| DE | 19824237 | 12/1999 |
| ES | 551862 | 2/1986 |
| ES | 2136496 | 11/1999 |
| WO | WO 02/076577 | 3/2002 |
| WO | WO/02/076577 | 10/2002 |

OTHER PUBLICATIONS

Cheremisinoff, Nicholas P. (2000). Handbook of Chemical Processing Equipment. (pp. 276). Elsevier.*
Database CA 'Online!, Chemical Abstracts Service, Columbus, Ohio, US, XP002303805, retrieved from STN, Database accession No. 115:34760, Abstract.
Database CA 'Online!, Chemical Abstracts Service, Columbus, Ohio, US, XP002303806, retrieved from STN, Database accession No. 114:30609, Abstract.
Article, Gil Guijarro, et al. "Mercury Removal from Gaseous Streams. Effects of Adsobent Geometry" Madrid, Spain 1996.
Dana Classification, Minerals Arranged by the New Dana Classification, 6 pages, copyright 1997.
John H. Pavlish, et al. "Application of Sorbents for Mercury Control for Utilities Burnign Lignite Coal," Fuel Processing Technology 85 (2004) pp. 563-576.
German Chemical Dictonary excerpt for "Rauch" (flue gases in English, 1992-1999.
German Chemical Dictionary excerpt for "Ton Mineralen" (clays in English), 1993.

* cited by examiner

*Primary Examiner*—Duane Smith
*Assistant Examiner*—Anthony Shumate
(74) *Attorney, Agent, or Firm*—Charles D. Gunter, Jr.

(57) ABSTRACT

A method for reducing heavy metals, in particular in mercury, present in flue gases, includes the step of bringing the flue gases into contact with a particular class of sorbent material in the dry state. A preferred class of dry sorbent materials can be provided from a mineral compound selected from among halloysites and phyllosilicates of the palygorskite subgroup and the sepiolite subgroup of the palygorskite-sepiolite group according to the Dana classification. Mineral compounds of this group have been shown to provide a reduction in heavy metals, in particular in mercury, present in flue gases.

7 Claims, No Drawings

METHOD FOR REDUCING HEAVY METALS IN FLUE GASES

BACKGROUND OF THE INVENTION

1. Field of the Invention

The present invention relates to a method for reducing heavy metals, in particular mercury, present in flue gases, comprising a stage of bringing the flue gases into contact with a sorbent solid material in the dry state.

2. Description of the Prior Art

The term "heavy metals" refers to the following chemical compounds listed here for illustrative purposes only: francium, radium, lanthanides, actinides, zirconium, hafnium, rutherfordium, vanadium, niobium, tantalum, dubnium, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, gallium, indium, thallium, germanium, tin, lead, arsenic, antimony, bismuth, polonium. The reduction method according to the invention mainly concerns the most common heavy metals, namely lead, chromium, copper, Mn, antimony, arsenic, cobalt, nickel, vanadium, cadmium, thallium and mercury, preferably lead, thallium, cadmium, mercury, and in particular mercury.

In the prior art the reduction in heavy metals, in particular mercury, present in flue gases is generally achieved by means of carbonated compounds such as active carbon or lignite coke. They may be used either as such or in a mixture with an alkaline absorbent in a fixed bed in granular form or by injection into the gas in powder form; the solid particles are then trapped upstream for example in the textile filter where the action is prolonged.

The efficacy of carbonated compounds for capturing these metals is unanimously acknowledged. Nonetheless the use of these carbonated compounds in flue gases has two major drawbacks:

- an increase in the carbon content in the dust from filtration of these gases, the carbon content being strictly regulated;
- the risk of flammability, which increases the higher the temperature of the gas to be cleaned.

An improvement made by the person skilled in the art to solve the problems of combustion of carbonated compounds has been to use them in a mixture with flammability retarders such as lime. Unfortunately this improvement, although effectively reducing the problem of combustion of carbonated compounds, has not solved it completely. In fact hot points can even appear at low temperatures (for example 150° C.), in particular in the presence of infiltration air in zones where carbonated compounds are accumulated. The carbonated compounds are also expensive compounds and the stage implementing such carbonated compounds is difficult to integrate into a complete process of flue gas treatment. In fact today a complete process, due to ever stricter new standards, must often also eliminate nitrogenated products from the flue gases. The elimination of nitrous oxides by the catalytic route is generally performed at a higher gas temperature (over 200° C.). For safe compatibility with a process stage using carbonated compounds, cooling of the flue gases and their heating must often be alternated. This represents a loss of economic benefit and time, and a significant energy loss. It is hence difficult to integrate carbonated compounds in a gas treatment process, given the combustion problems posed by these compounds.

Documents "ES 8704428" and "GIL M. ISABEL; ECHEVERRIA, SAGRARIO MENDIOROZ; MARTIN-LAZARO, PEDRO JUAN BERMEJO; ANDRES, VICENTA MUNOZ, Mercury removal from gaseous streams. Effects of adsorbent geometry, Revista de la Real Academia de Ciencias Exactas, Fisicas y Naturales (Espana) (1996), 90(3), pp 197-204" reveal that it is possible to avoid carbon in reducing heavy metals, in particular mercury, by using sulphur as a reagent. The sulphur is deposited on a mineral support such as natural silicates. Such formations thus remedy the said drawbacks of carbonated phases. In this case the silicate is considered as an inert support in relation to the pollutant to be captured; the latter is trapped by reaction with the sulphurous compound, generally to form a sulphide.

Unfortunately the silicates functionalized by sulphurous compounds are often dangerous, heavy and costly to produce, which penalizes their use. For example document ES 8704428 discloses sulphurisation of a silicate by oxidation reaction of hydrogen sulphide ($H_2S$) in a clearly defined molar proportion, with a view to adsorbing the elementary sulphur on the said silicate. The handling of toxic hydrogen sulphide ($H_2S$) is a dangerous operation and the strict molar proportion necessary to avoid any subsequent oxidation reaction is extremely restrictive.

SUMMARY OF THE INVENTION

The object of the invention is to remedy these drawbacks by providing a method for reducing heavy metals, in particular mercury, present in flue gases using a sorbent compound, the use of which is simplified, safer and cheap.

To this end the method according to the invention is characterized in that the sorbent solid material is a non-functionalized mineral compound selected from the group comprising halloysite and phyllosilicates of the sub-group "palygorskite-sepiolite" according to the Dana classification.

Here use of the sorbent compound requires only the obtaining of a conventional cheap product which is dry.

Furthermore the process comprises contact in the dry state at a temperature range between 70° C. and 350° C., preferably between 120° C. and 250° C. The possibility of operating at temperatures greater than 200° C. for contact allows a relatively constant temperature to be maintained throughout the flue gas treatment process and avoids the consecutive cooling and heating stages to eliminate firstly heavy metals then nitrous compounds by catalysis.

DETAILED DESCRIPTION OF THE INVENTION

The method according to the invention is a method of reducing heavy metals, in particular mercury, in flue gases, to be integrated preferably in a complete flue gas treatment. In fact the method according to the invention comprises a stage of elimination of the mostly acid pollutants by contact of said flue gases with alkaline absorbents. In general the mostly acid pollutants in flue gases comprise hydrochloric acid, hydrofluoric acid, sulphur oxides or nitrogen oxides, their contents on emission in flue gases before treatment being of the order of several tens to several hundreds $mg/Nm^3$.

In the method said alkaline absorbents, for example lime or calcium carbonate, and said non-functionalized mineral compound selected from the group comprising halloysite and phyllosilicates of the sub-group "palygorskite-sepiolite" according to the Dana classification, are used mixed together. This allows a saving in investment and space with a not insignificant economic impact as henceforth two steps can be performed at the same time and at the same place.

Other embodiments of the method are indicated in the dependent claims.

The present invention also relates to the use of a non-functionalized mineral compound in the dry state selected from the group comprising halloysite and phyllosilicates of the "palygorskite-sepiolite" sub-group in the Dana classification for the reduction of heavy metals, in particular mercury, present in flue gases and use of a mixture of alkaline absorbent and said non-functionalized mineral compound from the group comprising halloysite and phyllosilicates of the sub-group "palygorskite-sepiolite" in the dry state for the treatment of flue gases.

The object of the present invention is therefore a process for reduction of heavy metals, in particular mercury, present in flue gases by means of a mineral compound selected from the group comprising halloysite and phyllosilicates of the sub-group "palygorskite-sepiolite". The mineral compounds used for preference in the method according to the invention are halloysite and, from the group of phyllosilicates of the sub-group "palygorskite-sepiolite", sepiolite and palygorskite, also called attapulgite.

These mineral compounds are proposed as such (non-functionalized by a compound such as sulphur). Of the phyllosilicates, the present invention concerns those of the sub-group "palygorskite-sepiolite" according to the Dana classification. Halloysite and the phyllosilicates concerned by the invention have a high porosity, typically a porous volume between 0.25 and 0.8 cm$^3$/g, measured by the BJH method in nitrogen desorption. This porosity interval applies to pores of size between 2 and 100 nanometers.

Unexpectedly it has been shown that the mineral compounds of the group comprising halloysite and phyllosilicates allows a reduction in heavy metals, in particular mercury, present in flue gases.

In a preferred embodiment of the method according to the invention, the mineral compound is placed in contact with the gaseous flow to be processed either as such or in mixture with an alkaline absorbent such as lime. Preferably the mineral compound according to the invention is used in powder form, namely the size of the particles is less than 1 mm. The mineral compound is then injected pneumatically into the gaseous flow.

The invention will now be described in more detail by means of non-limitative examples.

Example 1

Non-functionalized sepiolite is used in a domestic refuse incinerator of capacity 8 t/h refuse, which generates around 50,000 Nm$^3$/h of flue gas to be processed. The sepiolite, 90% of the particles of which were of a size smaller than 600 μm, is metered via a screw and injected pneumatically into the gas flow at 150° C. at the rate of 12 kg/h then locked in a fabric filter.

The heavy metals contents were measured: mercury and (cadmium+thallium) in the gases after injection and the filter. The heavy metals are measured by atomic absorption or emission spectrometry with inductive coupling plasma:
- on solid particles transported by the gas, trapped on a filter then mineralized, and
- on volatile fractions captured by bubbling in a specific absorption solution; the content of heavy metals being the sum of the values measured for the particulate and volatile fractions.

The concentrations standardized on dry gas and at 11% oxygen are respectively 50 μg/Nm$^3$ for mercury and <10 μg/Nm$^3$ for the sum of the other two heavy metals. These results comply with current legislation.

For comparison, an injection of 7 kg/h active carbon in the same installation normally allows observation of the limit values of emissions of mercury and other heavy metals.

Example 2

The same sepiolite as in example 1 was injected in a similar fashion into the gases of another domestic waste incinerator at a high temperature of 190° C. With a capacity of 5 t/h, this incinerator generates a gas flow of 30,000 Nm$^3$/h; the sepiolite was metered as in example 1 at the rate of 5.5 kg/h.

The mercury concentrations measured before and after the addition of sepiolite in the method shown in example 1 are respectively 42 μg/Nm$^3$ and 8 μg/Nm$^3$, i.e. a mercury reduction rate of 80%.

It must be understood that the present invention is in no way limited to the embodiments described above and many modifications may be made without leaving the scope of the attached claims.

The invention claimed is:

1. Method for reducing heavy metal vapors, in particular mercury vapors, present in flue gases, the method comprising a stage of bringing flues gases into contact with a sorbent solid material in the dry state, characterized in that the sorbent solid material is a non-functionalised mineral compound selected from the group consisting of halloysite and phyllosilicates of the palygorskite subgroup and the sepiolite subgroup of the palygorskite-sepiolite group according to the Dana classification.

2. Method for reducing heavy metal vapors, in particular mercury vapors, present in flue gases according to claim 1, characterised in that said stage of contacting in the dry state is performed at a temperature in the range from 70° C. to 350° C.

3. Method for reducing heavy metal vapors, in particular mercury vapors, present in flue gases according to claim 1, characterised in that it also comprises a stage of eliminating the mostly acid pollutants by bringing said flue gases into contact with alkaline absorbents.

4. Method for reducing heavy metal vapors, in particular mercury vapors, present in flue gases according to claim 3, characterised in that said alkaline absorbents and said non-functionalised mineral compound which is selected from the group consisting of halloysite and phyllosilicates of the palygorskite subgroup and the sepiolite subgroup of the palygorskite-sepiolite group according to the Dana classification, are used in a mixture, which mixture is brought into contact with the flue gases.

5. Method for reducing heavy metal vapors, in particular mercury vapors, present in flue gases according to claim 1, characterised in that said non-functionalised mineral compound selected from the group consisting of halloysite and phyllosilicates of the palygorskite subgroup and the sepiolite subgroup of the palygorskite-sepiolite group according to the Dana classification, have a porous volume between 0.25 and 0.8 cm$^3$/g measured by the BJH method in nitrogen desorption.

6. Method for reducing heavy metal vapors, in particular mercury vapors, present in flue gases according to claim 1, characterised in that said non-functionalised mineral compound which is selected from the group consisting of halloysite and phyllosilicates of the palygorskite subgroup and the sepiolite subgroup of the palygorskite-sepiolite group is in the powder state.

7. Method for reducing heavy metal vapors, in particular mercury vapors, present in flue gases according to claim 1, characterised in that said non-functionalised mineral compound which is selected from the group consisting of halloysite and phyllosilicates of the palygorskite subgroup and the sepiolite sub group of the palygorskite-sepiolite group is injected pneumatically into a gas flow.

* * * * *